Patented June 13, 1939

2,161,861

UNITED STATES PATENT OFFICE 2,161,861

FRACTIONATION OF PROTEINACEOUS FLUIDS

Tillman D. Gerlough, Highland Park, N. J., assignor to E. R. Squibb & Sons, New York, N. Y., a corporation of New York No Drawing. Application November 26, 1937, Serial No. 176,653

12 Claims. (Cl. 167—78)

This invention relates to the fractionation of proteinaceous fluids containing (1) pseudoglobulins and (2) euglobulins and/or albumins and/or fibrinogen; more particularly, it relates to the preparation of antitoxins from body fluids containing pseudoglobulins and associated antibodies together with euglobulins, albumins, and other "relatively inactive proteins", which term is used herein to mean proteins with which little or no antibodies are associated.

Antitoxins are obtained from body fluids, such as sera, plasma, tissue extracts, exudates, and milk, which fluids, in their "whole" state, are hereinafter referred to as "native antitoxic fluids." In addition to the desired antibodies, these fluids contain a number of different proteins, principally classifiable as albumins, euglobulins, and pseudoglobulins, the antibodies being ordinarily associated almost entirely with the pseudoglobulin fraction. As employed herein, the term "antitoxin" embraces preparations of antibodies generally, e. g. antibacterial and antivirus antibodies as well as antitoxins proper.

In the preparation of antitoxins, it is considered desirable to remove from the native antitoxic fluid the albumins and euglobulins (and also the fibrinogen in certain fluids, e. g. plasma) as completely as possible without affecting the pseudoglobulins and associated antibodies. Heretofore, native antitoxic fluids have been refined and concentrated by fractionally precipitating the different proteins therefrom with inorganic salts in various concentrations, the salt most commonly used being ammonium sulfate. For example, a native antitoxic fluid such as antidiphtheric horse plasma was made 30 to 33% saturated with ammonium sulfate, and the precipitated euglobulin fraction was separated out; more ammonium sulfate was added to the filtrate until the concentration was 50% by volume of saturated ammonium sulfate solution, resulting in precipitation of the pseudoglobulin fraction and associated antibodies; the precipitate was separated from the filtrate (which contained the albumin fraction) and redissolved; after removal of any ammonium sulfate present (because of adherence to the precipitate), the antitoxin was ready for use. This procedure did not, however, yield an antitoxin of the desired degree of refinement.

It is the object of this invention to provide a simple and efficient process of fractionating proteinaceous fluids containing (1) pseudoglobulins and (2) euglobulins and/or albumins and/or fibrinogen; more particularly, to provide a process of preparing antitoxins more highly refined than obtainable by the ammonium sulfate process.

In the practice of this invention, a proteinaceous fluid (e. g. a native or a partially refined antitoxic fluid) is treated with a polyuronide. The relatively inactive proteins present (such as fibrinogen, euglobulin, some albumin, and possibly some inactive pseudoglobulin) are preferentially precipitated by the polyuronide, leaving a highly refined antitoxin solution containing pseudoglobulins and associated antibodies.

"Polyuronides" are substances which yield one or more uronic acids on hydrolysis. They may be obtained from many sources; for example, plant gums, gummic acids, and pectic bodies (such as acacia, lemon, cherry, tragacanth, and karaya gums, pectin, and pectic acid), from plants; alginic acid, from marine plants; and mucoitin and chondroitin sulfuric acid, from animals. Herein the term "polyuronide" is intended to embrace also related materials, such as agar-agar, salts of such of the foregoing substances as are acidic, and complex gums yielding uronic acids, such as cholla, ghatti, mesquite, flaxseed mucilage, and partially hydrolyzed cherry gum, gum tragacanth, and gum karaya.

More specifically, a diluted and preferably partially refined native antitoxic fluid is treated with an amount of a polyuronide more or less equivalent to the relatively inactive proteins present; and these proteins are thus preferentially precipitated, together with the polyuronide, leaving practically all of the antitoxic pseudoglobulin in solution; the precipitate is removed, and the antitoxic pseudoglobulin is then suitably concentrated (as by precipitation with ammonium sulfate and subsequent dialysis, simple evaporation, ultrafiltration, or precipitation with more polyuronide).

Preferably, in order to effect a better separation, the precipitation is carried out in dilute solution (e. g., containing about 1 to 5% proteins); in the presence of a low concentration—0.01 to 0.1 molar—of a salt, especially a neutral salt, such as sodium chloride, sodium acetate, sodium sulfate, sodium citrate, potassium chloride, ammonium sulfate; and at a slightly acid pH (ranging from about 6.5 to about 4.0), which may be attained by adding carbonic acid (carbon dioxide), hydrochloric acid, or citric acid, inter alia.

The amount of polyuronide required to remove a given quantity of protein varies, some of the polyuronides having the precipitation capacities, for serum globulin, shown in the following table:

| Polyuronide | Grams serum globulin precipitated per gram of polyuronide |
| --- | --- |
| Acacia | 2.0 to 2.5 |
| Lemon gum | 4.0 to 5.0 |
| Cherry gum | 3.0 to 4.0 |
| Tragacanth | 12.0 to 14.0 |
| Karaya | 4.0 to 5.0 |
| Pectin | 2.0 to 3.0 |
| Pectic acid | 14.0 to 18.0 |
| Alginic acid | 12.0 to 16.0 |
| Agar-agar | 2.5 to 3.0 |
| Chondroitin sulphuric acid | 18.0 to 20.0 |

This table shows the amount of serum globulin precipitated in the presence of 0.2% sodium chloride under optimal pH, which, for maximal precipitation, usually ranges from 5.6 to 4.2, depending upon the particular polyuronide used and the concentration of salt present. In concentrations of salt greater than the molar equivalent of 0.2% sodium chloride, the pH of maximal precipitation shifts to a more acid range; in less salt, to a less acid range. The amount of precipitate also varies more or less inversely as the concentration of the salt.

The mode of precipitation of the proteins by the various polyuronides appears to be qualitatively the same. Presumably, the differences in precipitating power per gram are due to the amount and availability of the uronic (and possibly other) acid groups present. The polyuronides from different sources may vary in composition to a minor extent, and such variation may give rise to precipitation values deviating from those given in the table.

All known antitoxins are associated with the pseudoglobulin fraction of the immune body fluid, and, in general, any method of purification that has been found effective for one kind of antitoxin has likewise been found applicable in principle to every other known antitoxin. Accordingly, the process of this invention may be utilized in connection with antitoxins and antibody materials generally, e. g. diphtheria antitoxin, tetanus antitoxin, hemolytic streptococcus antitoxin, staphylococcus antitoxin, perfringens antitoxin, vibrion septique antitoxin, erysipelas antitoxin, gas-gangrene antitoxins, antipneumococcic serum, and antimeningococcic serum.

The purification process is applicable either to native antitoxic fluids or to the partially refined antitoxic fluid obtained by the customary salting-out method. Of course, the amount of protein to be precipitated by the polyuronide differs with the type of antitoxin solution. In the cases of native serum or plasma containing a high percentage of inactive protein, it is preferable to remove about 60 to 70% of the total protein in order to obtain a high degree of purification. With a partially refined antitoxic fluid, 25 to 45% of the protein should be removed. Further purification and concentration may be effected by repetition of the process under similar conditions.

The antitoxins prepared by the customary ammonium sulfate process have a potency of about three to four times that of the native material; whereas, when prepared according to the process of this invention, the antitoxins have a potency of about six times that of the native material, and, in some cases, still more. The resulting higher potency enables the injection of smaller volumes to obtain the same effects, or the administration of larger amounts of antibodies in the same injected volumes.

The following examples are illustrative of the invention:

Example 1

41,300 cc. of antidiphtheric horse plasma containing (when compared against the official standard diphtheria antitoxin distributed by the National Institute of Health) 500 units per cc. is refined by the customary ammonium sulphate salting-out method. The refined antitoxic pseudoglobulin fraction thus obtained is diluted with distilled water to 56,000 cc., the protein concentration being then about 2.2 grams per 100 cc. Sufficient sodium chloride is then added to make the concentration 0.21 gram sodium chloride per 100 cc. of globulin solution, and a solution of 25 grams of neutralized pectic acid in 800 cc. of water is added (which solution is prepared by dissolving pectic acid containing, for example, 95 to 97% polygalacturonide in a neutralizing amount of dilute sodium hydroxide). The pH of the mixture is then adjusted to between 5.6 and 5.8, preferably by bubbling carbon dioxide therethrough, and the precipitate formed is allowed to settle for 12 to 24 hours at a temperature of 4 to 5° C. and is then removed, preferably by centrifugation; and the antitoxic pseudoglobulin in the supernatant liquid is concentrated by suitable means. The yield is 4500 cc. of antitoxic globulin containing 3200 units per cc.

Example 2

5500 cc. of antidiphtheric horse plasma containing (when compared against the official standard diphtheria antitoxin distributed by the National Institute of Health) 875 units per cc. is refined by the customary ammonium sulphate salting-out method. The 1180 cc. of concentrated antitoxic globulin obtained, containing 3300 units per cc., is diluted to a volume of 9000 cc. with distilled water, and sodium chloride added to a concentration of 0.15%. Five grams of sodium alginate (yielding on analysis 99.6% hexuronic acid—when corrected for ash and moisture) dissolved in a 0.15% sodium chloride solution is then added and carbon dioxide bubbled through until the pH is lowered to between 5.5 and 5.7. The precipitate formed is removed, and dilute hydrochloric acid added to the supernatant liquid to a pH of 4.9; the additional precipitate formed is removed, and the antitoxic globulin in the supernatant liquid is concentrated by suitable means, yielding 750 cc. of antitoxic globulin containing 5000 units per cc.

Example 3

733 cc. of concentrated antitetanic horse globulin refined by the customary ammonium sulphate salting-out method, and containing (when compared against the official standard tetanus antitoxin distributed by the National Institute of Health) 1900 units per cc., is diluted to 10,000 cc. with distilled water. The sodium chloride concentration is brought to 0.10%, and 38 grams of gum acacia dissolved in water is added. On adjustment of this mixture to a pH of 4.4 by the addition of 40 cc. of N/1 hydrochloric acid, a heavy precipitate forms, and settles out rapidly. Most of the precipitate adheres to the walls of the reaction chamber. The supernatant solution contains the antitoxin; it is decanted, and clarified by filtration through paper pulp or by centrifugation. The clarified supernatant liquid is then concentrated by suitable means; 335 cc. of antitetanic globulin is obtained, containing 3270 units per cc.

Example 4

1000 cc. of citrated antidiphtheric horse plasma containing (when compared against the official standard diphtheria antitoxin distributed by the National Institute of Health) 475 units per cc. is diluted with distilled water to 3000 cc., the pH adjusted to 6.7, and the solution heated 1¼ hours at 59° C. and then cooled. To the diluted plasma, 12 grams of gum karaya dispersed in 1000 cc. of water is added, and the volume is further increased to 5500 cc. The pH is adjusted to 4.86 by means of 35 cc. of M/1 citric acid; the bulky precipitate which forms, containing the fibrinogen, euglobulin, and some albumin, is centrifuged off, and the clear supernatant solution, carrying the major portion of the antitoxic fraction, is concentrated, yielding antitoxic globulin containing 3100 units per cc.

Example 5

1200 cc. of antidiphtheric horse serum containing 450 units per cc. (when compared with the standard diphtheria antitoxin distributed by the National Institute of Health) is diluted to 4000 cc.; 5.6 cc. of a calcium chloride solution (containing 15 grams calcium chloride per 10 cc. of solution) is added, followed by 480 cc. of a sodium pectate solution (prepared by dissolving 6.0 grams of pectic acid in a neutralizing amount of sodium hydroxide solution) and 400 cc. of water; and the pH is adjusted to 6.0 by adding 40 cc. of N/1 hydrochloric acid. The precipitate which forms is removed by centrifugation, and the supernatant liquid, which contains the desired antitoxin, is further treated with 200 cc. of a solution of sodium pectate (prepared as above from 2.0 grams of pectic acid), sufficient sodium chloride being added to maintain the salt content at the molar equivalent of about 0.2% sodium chloride. The mixture is saturated with carbon dioxide and further acidified with 2.0 cc. of N/1 hydrochloric acid. The precipitate formed is removed by centrifugation, and the supernatant fluid is concentrated, yielding 122 cc. of globulin containing 2800 units per cc.

Example 6

1000 cc. of Type I antipneumococcic rabbit serum containing 1200 units per cc. is diluted with 4000 cc. of water and treated with 400 cc. of a solution of sodium pectate (prepared by dissolving 4.0 grams of pectic acid in a neutralizing amount of sodium hydroxide solution), followed by sufficient N/1 hydrochloric acid to lower the pH to 4.3. The precipitate which forms is removed by centrifugation, dissolved in about 4 liters of 0.15% sodium chloride solution with the aid of sodium hydroxide, and reprecipitated by means of hydrochloric acid. Practically all the proteins usually recognized as euglobulins and albumins are removed in the pectate precipitate, the supernatant liquids being substantially free from them. The two supernatant liquids from the pectate precipitate are clarified by filtration through paper pulp and adjusted to a pH of about 7.0 with solid sodium bicarbonate; the liquids are then combined and suitably concentrated, yielding 66 cc. of globulin solution (the protein concentration of which is 20 grams per 100 cc. of solution) having a potency of 10,300 units per cc.

Example 7

400 cc. of a scarlet fever (hemolytic streptococcus) antitoxin refined by the customary ammonium sulphate procedure and containing 500 U. S. P. H. S. units per cc., is treated with 8 grams of lemon gum in a total volume of 4500 cc. of solution containing approximately 0.13% sodium citrate and 0.22% sodium chloride. The pH of the mixture is adjusted to 4.32 with 59 cc. of M/1 citric acid. The total volume is then increased to 7110 cc., the precipitate is removed by centrifugation, and the supernatant liquid clarified by filtration through paper pulp. After suitably concentrating the supernatant liquid, 180 cc. of globulin containing 1000 U. S. P. H. S. units per cc. is obtained.

The invention may be variously otherwise embodied—as with respect to the particular fluids or antitoxins treated, the polyuronides employed, and the procedures followed—within the scope of the appended claims.

I claim:

1. The process of fractionating proteinaceous fluids containing pseudoglobulins and relatively inactive proteins, comprising preferentially precipitating the latter with a polyuronide.

2. In the process of preparing antitoxins from body fluids containing pseudoglobulins and associated antibodies together with relatively inactive proteins, the step of preferentially precipitating the latter with a polyuronide.

3. The process of preparing antitoxins which comprises partially refining a native antitoxic fluid by removal of relatively inactive proteins with an inorganic salt, and precipitating remaining relatively inactive proteins from the partially refined antitoxic fluid with a polyuronide.

4. In the process of preparing antitoxins, the step of precipitating the relatively inactive proteins from a partially refined native antitoxic fluid with a member of the group consisting of pectic acid and its salts.

5. In the process of preparing antitoxins, the step of precipitating the relatively inactive proteins from a partially refined native antitoxic fluid with gum acacia.

6. In the process of preparing antitoxins, the step of precipitating the relatively inactive proteins from a partially refined native antitoxic fluid with a member of the group consisting of alginic acid and its salts.

7. The process of preparing antitoxins which comprises diluting an antitoxic fluid with water to a protein concentration of about 1 to 5%, and precipitating the relatively inactive proteins therefrom with a polyuronide.

8. In the process of purifying antitoxic solutions, the step of precipitating the euglobulin and albumin therefrom by treatment with a polyuronide, the solution being slightly acid and having a low concentration of a neutral salt.

9. The process of preparing antitoxins from body fluids containing pseudoglobulins and associated antibodies together with relatively inactive proteins, comprising adjusting the neutral salt concentration of the body fluid to within the range 0.01 to 0.1 molar, and precipitating the relatively inactive proteins with a polyuronide.

10. The process of preparing antitoxins from body fluids containing pseudoglobulins and associated antibodies together with relatively inactive proteins, comprising adjusting the sodium chloride concentration of the body fluid to within the range 0.01 to 0.1 molar, and precipitating the relatively inactive proteins with a polyuronide.

11. The process of preparing antitoxins which comprises adjusting the pH of a native antitoxic fluid to between 6.5 and 4.0, and precipitating the relatively inactive proteins with a polyuronide.

12. In the process of fractionating proteinaceous fluids containing pseudoglobulins and relatively inactive proteins, the step of preferentially precipitating the latter with a material of the group consisting of acacia, lemon, cherry, tragacanth, and karaya gums and pectin, pectic acid, pectic acid salts, alginic acid, alginic acid salts, agar-agar, mucoitin sulfuric acid, chondroitin sulfuric acid, cholla gum, ghatti gum, mesquite gum, flaxseed mucilage, partially hydrolyzed cherry gum, partially hydrolyzed gum tragacanth, and partially hydrolyzed gum karaya.

TILLMAN D. GERLOUGH.